United States Patent Office.

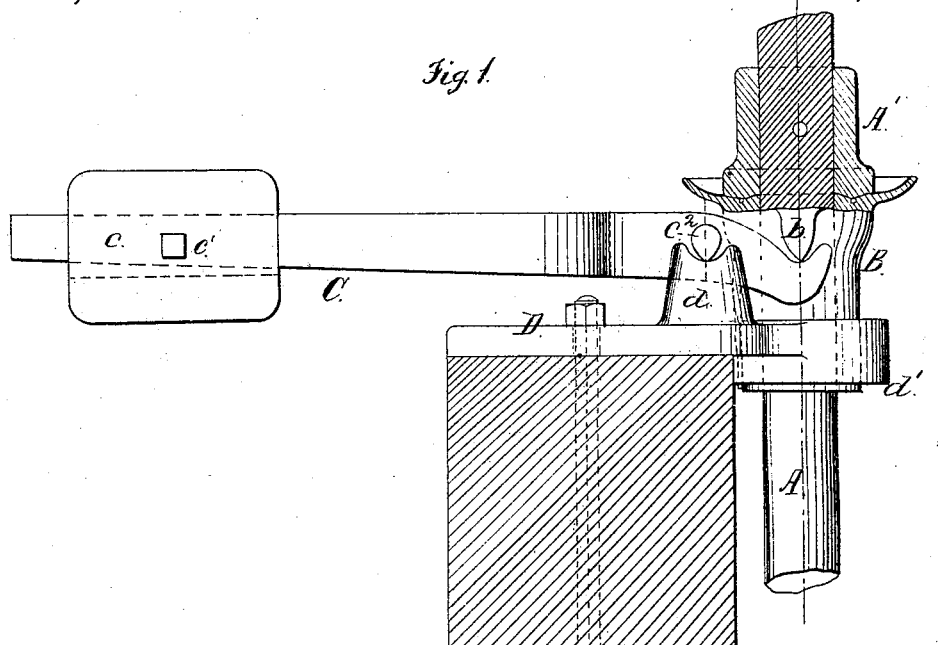
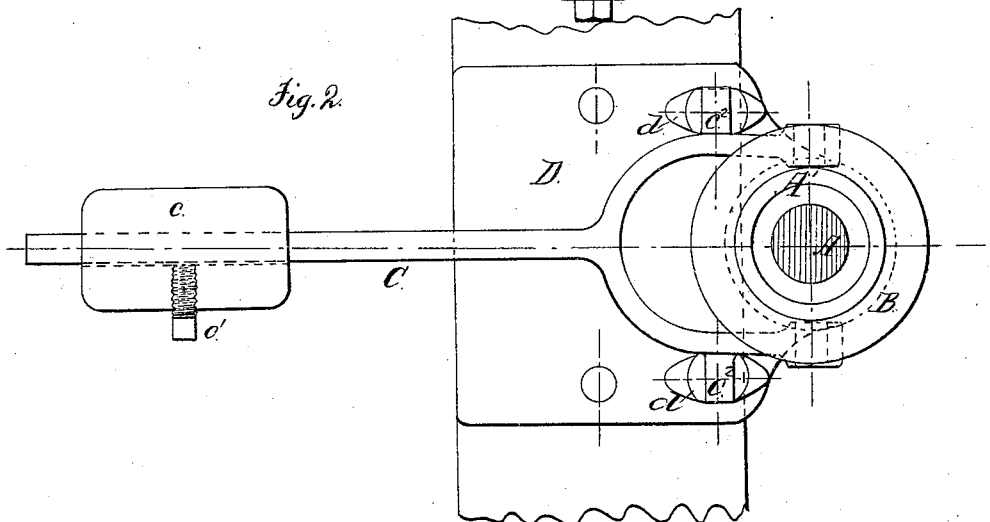

WILLIAM BAYLEY, OF BALTIMORE, MARYLAND.

Letters Patent No. 101,083, dated March 22, 1870.

IMPROVEMENT IN ADJUSTABLE BEARINGS FOR WATER-WHEEL SHAFTS.

The Schedule referred to in these Letters Patent and making part of the same.

*To all whom it may concern:*

Be it known that I, WILLIAM BAYLEY, of the city and county of Baltimore, in the State of Maryland, have invented certain new and useful Improvements in Adjustable Bearings for Water-Wheel Shafts, &c., of which the following is a full, clear, and exact description.

The object of my invention is to provide an improved method of suspending water-wheels which revolve upon vertical shafts, whereby the weight of the wheel and its shaft may be partially or entirely counterbalanced, for the purpose of preventing undue friction upon the step, and of elevating the wheel, as may be required to compensate for the wear of the step, thus enabling the same to be maintained in proper relation to its guide, curves or chutes, and affording increased facilities for the lubrication of the bearing-surfaces, as well as rendering the same readily accessible for renewal or repair, to which ends—

My improvement consists in a novel combination of a weighted lever having its fulcrum upon a portion of the framing or masonry upon which the wheel is erected, with a sleeve or annular bearing hung upon one arm of the lever aforesaid, and a collar secured upon the wheel-shaft and bearing upon the said sleeve, by which arrangement the weight upon the lever may be regulated so as to counterbalance the whole or any desired portion of the weight of the wheel and shaft, and to elevate the same in proportion to the wear of the step.

In most turbine wheels of ordinary construction, the step is immersed in the wheel-pit, in a position necessarily difficult of access for lubrication or repair.

The step bears the whole weight of the wheel and shaft, and is lubricated either by water, an inferior lubricant, or by forcing in oil to the wearing-surfaces, the latter method being inconvenient and expensive of maintenance.

As the step wears, the wheel settles upon it, and will frequently drop so low that the water issuing from the guide-curves or chutes escapes above the tops of the buckets, instead of passing through them, and the useful effect of the wheel is correspondingly reduced.

There is no means of compensating for the wear upon the step except to draw off the water from the wheel, and line up or renew the step in its position in the wheel-pit.

By the use of my invention, the weight upon the step may be reduced to that amount which is merely sufficient to keep the shaft-bearing thereon, and the lubrication is performed, with oil or other suitable lubricant, upon a collar-bearing, which, being above the wheel, is readily accessible, and by proper adjustment of the weight upon the lever the wheel can be maintained in its normal vertical position.

In the accompanying drawings—

Figure 1 is a side view, partly in elevation and partly in section, of my improvements as applied to the shaft of a turbine wheel, and Figure 2, a plan or top view of the same.

A collar-bearing, A', is secured in the ordinary manner upon a wheel-shaft, A, revolving upon a step at bottom of the ordinary form, at any suitable height above the wheel, its position being regulated by the form and arrangement of the framing or masonry within which the wheel is erected, upon any convenient portion of which is firmly secured a fulcrum-plate, D.

An unequal armed lever, C, is suspended upon fulcra $d$, on the plate D, by pivots $c^2$, and is bifurcated towards its short arm, which is next the shaft A, so as to partially encircle the same.

An annular bearing or sleeve, B, upon which the collar A' of the shaft A bears, is supported by its pivots $b$ upon the bifurcated short arm of the lever C, the long arm of which carries a weight, $c$, maintained in position by a set-screw, $c^1$, or in any other manner which will allow of its adjustment toward or from the fulcra $d$.

The annular bearing B passes through a guide, $d'$, cast with or secured upon the plate D, by which its movements are prevented from deviating from a vertical line.

The weight $c$ is to be so regulated upon the lever C as to partially or entirely counterbalance the weight of the wheel and shaft, according as a greater or lesser amount of weight is to be borne by the step at the bottom of the shaft, and the lubrication of the wearing-surfaces of the collar A' and annular bearing B can be readily effected from their convenience of access, thus affording an oil bearing for the wheel which is simple and cheap in its construction, and free from liability to undue wear or derangement of its parts.

It is obvious that the elasticity of a spring or other resistance which is capable of being varied, might be substituted for a weight, without affecting the principle of my invention, and in certain cases a compound lever may be advantageously substituted for a simple one.

What I claim as my invention, and desire to secure by Letters Patent, is—

The combination of the water-wheel shaft A, the collar A', the sleeve B, and the counterbalanced lever C, in such manner as to sustain the weight of the wheel, compensate for the wear of the step, and afford convenient access for lubrication, all these parts being constructed to operate as set forth.

In testimony whereof I have hereunto subscribed my name.

WM. BAYLEY.

Witnesses:
JULIA HARTZELL,
BENJ. L. VIESSMAN.